(12) United States Patent
Tin

(10) Patent No.: US 12,328,578 B2
(45) Date of Patent: Jun. 10, 2025

(54) QUANTUM SERVICE AUTHORIZATION MANAGEMENT FOR SECURITIZING 5G NETWORK SLICING

(71) Applicant: WISTRON CORPORATION, New Taipei (TW)

(72) Inventor: Hsiao-Wen Tin, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 403 days.

(21) Appl. No.: 18/053,608

(22) Filed: Nov. 8, 2022

(65) Prior Publication Data

US 2024/0155345 A1   May 9, 2024

(51) Int. Cl.
*H04W 12/084*   (2021.01)
*H04W 84/04*   (2009.01)

(52) U.S. Cl.
CPC ........ *H04W 12/084* (2021.01); *H04W 84/045* (2013.01)

(58) Field of Classification Search
None
See application file for complete search history.

(56) References Cited

U.S. PATENT DOCUMENTS

| | | | |
|---|---|---|---|
| 10,785,652 B1 * | 9/2020 | Ravindranath | H04W 12/48 |
| 11,469,889 B1 | 10/2022 | Balmakhtar et al. | |
| 2017/0034198 A1 | 2/2017 | Powers et al. | |
| 2017/0146350 A1 * | 5/2017 | Beaurepaire | H04W 4/029 |
| 2019/0014504 A1 | 1/2019 | Shimojou et al. | |
| 2020/0007335 A1 | 1/2020 | Tan et al. | |
| 2020/0162919 A1 * | 5/2020 | Velev | H04W 60/00 |
| 2020/0250566 A1 | 8/2020 | Majumdar | |

(Continued)

FOREIGN PATENT DOCUMENTS

| CN | 112367167 A | 2/2021 |
|---|---|---|
| JP | 20070329344 A | 12/2007 |

(Continued)

OTHER PUBLICATIONS

Security Aspects of eNPN, 3GPP TSG-SA3 Meeting #105-e, 28 pages (2021).

(Continued)

*Primary Examiner* — Kaveh Abrishamkar
(74) *Attorney, Agent, or Firm* — Peigen Jiang; Greenberg Traurig, LLP

(57) ABSTRACT

Systems and methods for verifying a service request by a quantum service authorization management (QSAM) in a 5G network with a plurality of service slices used by a plurality of base stations to provide services to a plurality of user equipment include registering the plurality of user equipment, generating a token containing information identifying a first base station of the plurality of base stations providing services to a first user equipment of the plurality of user equipment through a first service slice of the plurality of service slices, sending the generated token to the first user equipment, receiving the generated token when the first user equipment requesting service from the first base station using the first service slice, granting the service request if the received token is verified as valid, and denying the service request if the received token is verified as invalid.

14 Claims, 4 Drawing Sheets

(56) References Cited

U.S. PATENT DOCUMENTS

| | | | | |
|---|---|---|---|---|
| 2020/0280854 A1* | 9/2020 | Kunz | ................ | H04W 12/0431 |
| 2021/0029216 A1* | 1/2021 | Stockert | .............. | G06F 16/2365 |
| 2021/0058784 A1* | 2/2021 | Kedalagudde | ........ | H04W 76/12 |
| 2021/0398621 A1* | 12/2021 | Stojevic | ................. | G16C 10/00 |
| 2022/0124844 A1* | 4/2022 | Boyapalle | ............. | H04W 40/16 |
| 2022/0158855 A1* | 5/2022 | Wentz | ................... | H04L 9/3247 |
| 2022/0166773 A1* | 5/2022 | Trost | ................... | H04L 63/0807 |
| 2022/0210722 A1* | 6/2022 | Saini | ..................... | H04W 84/12 |
| 2022/0408255 A1* | 12/2022 | Howe | ................. | H04W 12/062 |
| 2023/0112482 A1* | 4/2023 | Stockert | ............... | H04W 48/02 |
| | | | | 707/822 |

FOREIGN PATENT DOCUMENTS

| | | | |
|---|---|---|---|
| JP | 2008514056 | A | 5/2008 |
| JP | 2017157997 | A | 9/2017 |
| JP | 2019517203 | A | 6/2019 |
| JP | 2020053894 | A | 4/2020 |
| JP | 2022062483 | A | 4/2022 |
| JP | 2022115373 | A | 8/2022 |
| JP | 2023024233 | A | 2/2023 |

OTHER PUBLICATIONS

Bartlett, Rodney J., "Adventures in DFT by a wavefunction theorist," J. Chem. Pbhys. 151 (2019).
Efthymiou et al., "Tensor Network for Machine Learning," 9 pages (2019).
Desrosiers et al., "The Basics of Tensor Network," 5 pages (2018).

* cited by examiner

QUANTUM SERVICE AUTHORIZATION MANAGEMENT FOR SECURITIZING 5G NETWORK SLICING

BACKGROUND

The present disclosure relates generally to the field of cellular or wireless telecommunications, and, more particularly, to systems and methods for securitizing 5G network slicing.

In telecommunications, 5G is the fifth-generation technology standard for broadband cellular networks. 5G networks are cellular networks, in which the service area is divided into small geographical areas called cells. All 5G wireless devices in a cell communicate by radio waves with a cellular base station via fixed antennas, over frequency channels assigned by the base station. The base stations, termed gNodeBs, are connected to switching centers in the telephone network and routers for Internet access by high-bandwidth optical fiber or wireless backhaul connections.

5G network slicing is a network architecture that enables the multiplexing of virtualized and independent logical networks on the same physical network infrastructure. Each network slice is an isolated end-to-end network tailored to fulfil diverse requirements requested by a particular application. One application may require higher speeds, another low latency, and yet another access to edge computing resources. By creating separate slices that prioritize specific resources a 5G operator can offer tailored solutions to particular industries.

A network slice instance is a custom end-to-end logical network that meets the required network characteristics and provides specific services to serve specific use cases (e.g., voice communications, video streaming, e-health, vehicle communications). A logical network is a set of network function instances on top of physical and virtual resources such as storage, networking, processing, and access nodes. A network slice subnet instance is a (local) logical network. One or more network slice subnet instances linked together can form a network slice instance.

During a life cycle of network service slices, each stage faces different threats and possible attack points. Among them a "run stage" faces most threats, such as denial-of-service (DoS) attacks, performance attacks, data breaches and privacy breaches. Additionally, there are management-related threats, such as unauthorized configuration changes, persist at runtime, and new threats emerge, such as disabling the use of slicing. Immediate threats within slices include unauthorized access to slices or services. In addition to privacy and confidentiality concerns, unauthorized access can also affect resource consumption, opening up the possibility of DoS attacks.

For example, slice identification can become a vulnerability related to persistent identifiers of customer devices, by dividing interest groups made up of users who use the same slice, and therefore likely use the same service. The associated risk increases when 5G customer equipment (UE) accesses network slices over non-3GPP networks.

Specific and common mitigation techniques include strong authentication and access control for 5G customer equipment (UE). In addition to the primary authentication that allows the device to access the network, secondary authentication (or slice-specific authentication) is also done at the slice level. Depending on the scenario, different operations may be allowed in the API: creating or deleting slices, different levels of configuration, reporting and monitoring. However, in the case of a large amount of data and large dimensions, under the current CPU core and pipeline conditions, it is difficult to realize that after several elements interact with each other. In such scenario, because each element has been integrated into the overall system, it is impossible to describe the properties of each element individually—only the properties of the whole system can be described. This phenomenon is called quantum entanglement. A tensor network can be used to represent quantum entanglement. A tensor network can not only express complex high-order tensor computations cleverly with network graphs, but also express quantum systems in complex entanglement simply and easily. The present disclosure regards a network slice as a quantum state and entangles these quantum states, thereby protects the security of the entire service slice through quantum tokens.

As such, what is desired is systems and methods that can protect a complex communication system with integrated elements.

SUMMARY

Systems and methods for verifying a service request by a quantum service authorization management (QSAM) in a 5G network with a plurality of service slices used by a plurality of base stations to provide services to a plurality of user equipment include registering the plurality of user equipment by the QSAM, generating a token containing information identifying a first base station of the plurality of base stations providing services to a first user equipment of the plurality of user equipment through a first service slice of the plurality of service slices, sending the generated token to the first user equipment by the QSAM, receiving, by the QSAM, the generated token when the first user equipment requesting service from the first base station using the first service slice, granting, by the QSAM, the service request if the received token is verified as valid, and denying, by the QSAM, the service request if the received token is verified as invalid.

In embodiments, the token is generated by encoding identifications of the plurality of base stations and the plurality of user equipment, transforming the encoded information into a tensor network to describe entanglements of the plurality of base stations and the plurality of user equipment, obtaining a quantum wavefunction from the tensor network for the first user equipment using the first service slice, and providing the quantum wavefunction as the token.

In embodiments, the token is verified by detecting quantum entanglement differences between the generated token and the received token by the QSAM.

In embodiments, the QSAM generates a new token to be sent to the first user equipment after the received token being verified as invalid and the first user equipment being updated to use the first service slice.

In embodiments, the token has an expiration time, and a new token is generated only if a remaining lifetime of the received token is longer than a token refresh time plus a predetermined threshold time.

Figure 1:
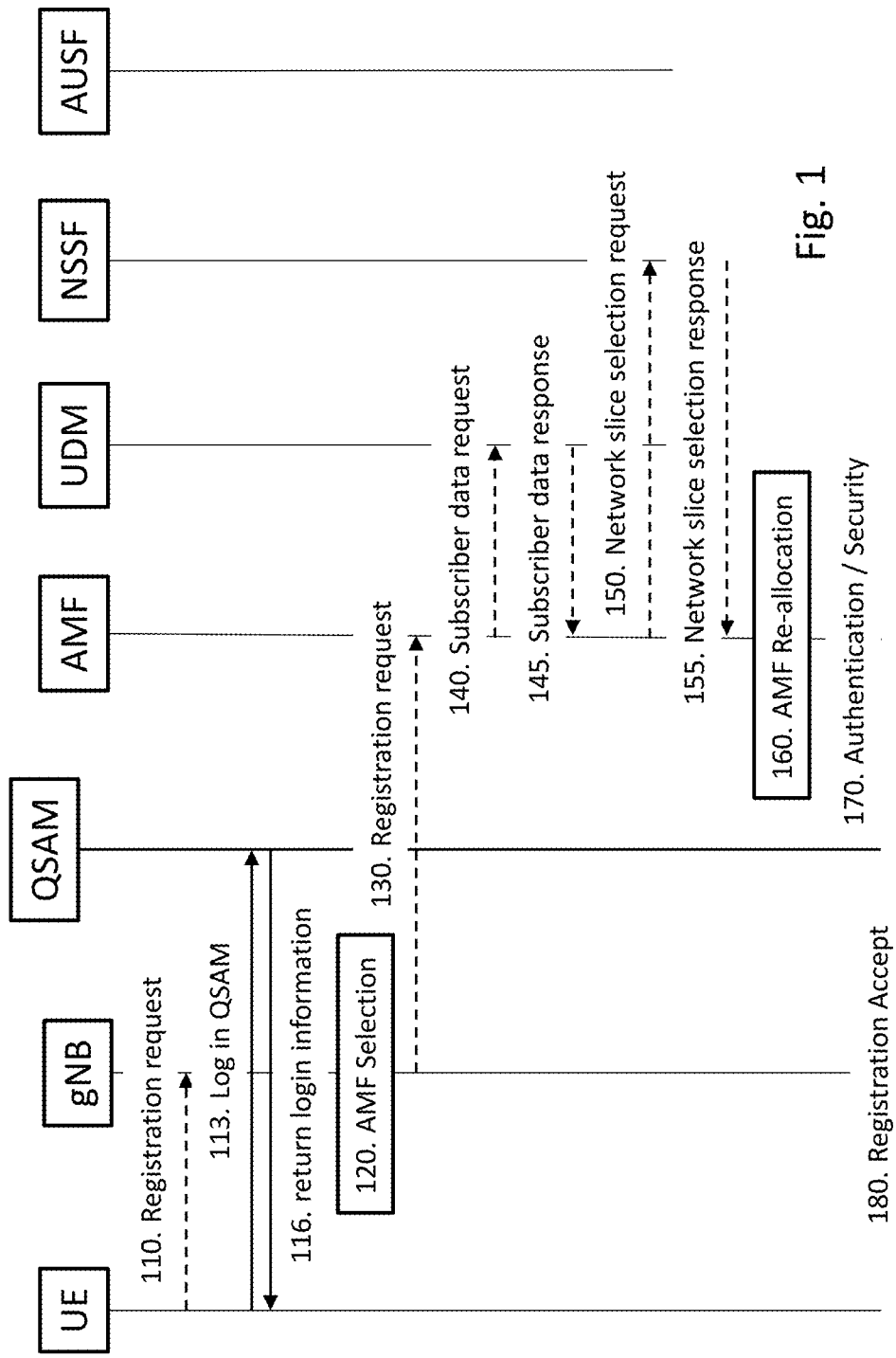
FIG. 1 is a flowchart illustrating a 5G network slicing process employing a quantum service authorization management (QSAM) according to an embodiment of the present disclosure.

The drawings accompanying and forming part of this specification are included to depict certain aspects of the disclosure. A clearer conception of the disclosure, and of the components and operation of systems provided with the disclosure, will become more readily apparent by referring to the exemplary, and therefore non-limiting, embodiments illustrated in the drawings, wherein like reference numbers (if they occur in more than one view) designate the same elements. The disclosure may be better understood by reference to one or more of these drawings in combination with the description presented herein.

DESCRIPTION

The present disclosure relates to adding a service authorization management to 5G network slicing processes. Preferred embodiments of the present disclosure will be described hereinafter with reference to the attached drawings.

In a telecommunication network, a plurality of elements are integrated in an overall system. For example, in a 5G network, a User Equipment (UE) can use various network slices with various next generation NodeBs (gNBs); similarly, a gNB can provide to various UEs through various network slices. These relationships can be compared to as quantum entanglement. A tensor network can be used to represent quantum entanglement. A tensor network can not only express complex high-order tensor computations cleverly with network graphs, but also express quantum systems in complex entanglement simply and easily. The present disclosure regards a network slice as a quantum state and entangles these quantum states, thereby protects the security of the entire service slice through quantum tokens.

The wireless communication environment includes a mobile communication device and a telecommunication network, wherein the mobile communication device may wirelessly connect to the telecommunication network for obtaining mobile services, including services of the eMBB, URLLC, and mMTC applications.

The mobile communication device may be referred to as a UE or Mobile Station (MS), such as a smartphone, a panel Personal Computer (PC), a laptop computer, or any computing device supporting the cellular technology utilized by the telecommunication network.

The telecommunication network may include an access network and a core network. The access network is responsible for processing radio signals, terminating radio protocols, and connecting the mobile communication device with the core network, while the core network is responsible for performing mobility management, network-side authentication, and interfaces with public/external networks (e.g., the Internet). The access network and the core network may each include one or more network nodes for carrying out said functions.

In one embodiment, the telecommunication network is a 5G (e.g., New Radio (NR)) network, and the access network and the core network are a Next Generation-Radio Access Network (NG-RAN) and a Next Generation-Core Network (NG-CN), respectively.

An NG-RAN may include one or more base station, such as gNBs. Each gNB may support wireless transmission and reception on high frequency bands, and each gNB may further include one or more Transmission Reception Points (TRPs). Each gNB and TRP may be referred to as a 5G base station.

Each 5G base station may form one or more cells to provide wireless accesses to the mobile communication device. For example, the mobile communication device may camp on one or more cells, wherein the camped cells may be referred to as serving cells.

An NG-CN may include various network functions. In the network slicing technology, these network functions may be divided into UE-level network functions and service-level network functions. The UE-level network functions may include registration management, signaling connection management, mobility management, and access authentication and authorization, etc., while the service-level network functions may include session management, and path selection and management, etc.

Taking a 5G network as an example, the UE-level network functions at least include the Network Access Control Function (NACF). Logically, an NACF instance may simultaneously exist in multiple network slice instances to provide the functions of registration management and mobility management to all service sessions of a UE. On the other hand, the service-level network functions at least include the Session Management Function (SMF). Logically, there may be a respective SMF instance in each network slice instance, and each SMF instance provides the functions of session management and path selection and management for a respective service session.

For example, the mobile communication device may start multiple service sessions simultaneously. Each service session is served by a respective network slice instance, and each network slice instance includes all network functions necessary to meet the requirement of the service session.

It should be understood that the components described in the above embodiment are for illustrative purpose only and are not intended to limit the scope of the present disclosure. For example, the telecommunication network may utilize any cellular technology (e.g., 6G or any future cellular technology) other than the 5G cellular technology, as long as the utilized cellular technology supports network slicing.

FIG. 1 is a flowchart illustrating a 5G network slicing process employing a quantum service authorization management (QSAM) according to an embodiment of present disclosure. When a user equipment (UE) request a registration for service with a base station (gNB) in step 110, the UE also logs in the QSAM in step 113. Upon a successful login, the QSAM sends back the login information to the UE in step 116. As an example, the QSAM includes encoding tables, a quantum token computing module, a threshold number of service requests and a token legitimacy detection module.

After the successful QSAM login, the base station gNB selects an access and Mobility Management function (AMF) for the UE in step 120. The AMF mainly provides registration, connection and mobility management. A UE has to complete registration process with the registration management to obtain authorization to use the 5G services. The UE, such as a smartphone or a tablet computer, requests network slice selection assistance information (NSSAI) from the 5G radio access network (RAN) which then transfers the request to a target AMF.

In step 130, the gNB sends the registration request to the AMF which then sends a subscriber data request to a unified data management (UDM) function in step 140. The UDM function then send back a subscriber data response back to the AMF in step 145.

The AMF authenticates the UE's registration request by requesting a network slice selection function (NSSF) to provide a NSSAI that belongs to the UE in step 150. The NSSF transmits network slice conditions of the UE back to the AMF in step 155. Then the AMF assigns the UE to the selected network slice and provides such information to the UE as a form of accepting the UE's network slice registration.

After the above steps of security procedure are finished, the AMF can recognize the UE and determine whether it is a fit to provide service to. If such AMF is not the right one for the UE, then the AMF should be re-allocated in step 160. A new AMF will go through authentication and security procedure again in step 170. Then in step 180, the UE's registration is accepted.

Figure 2:
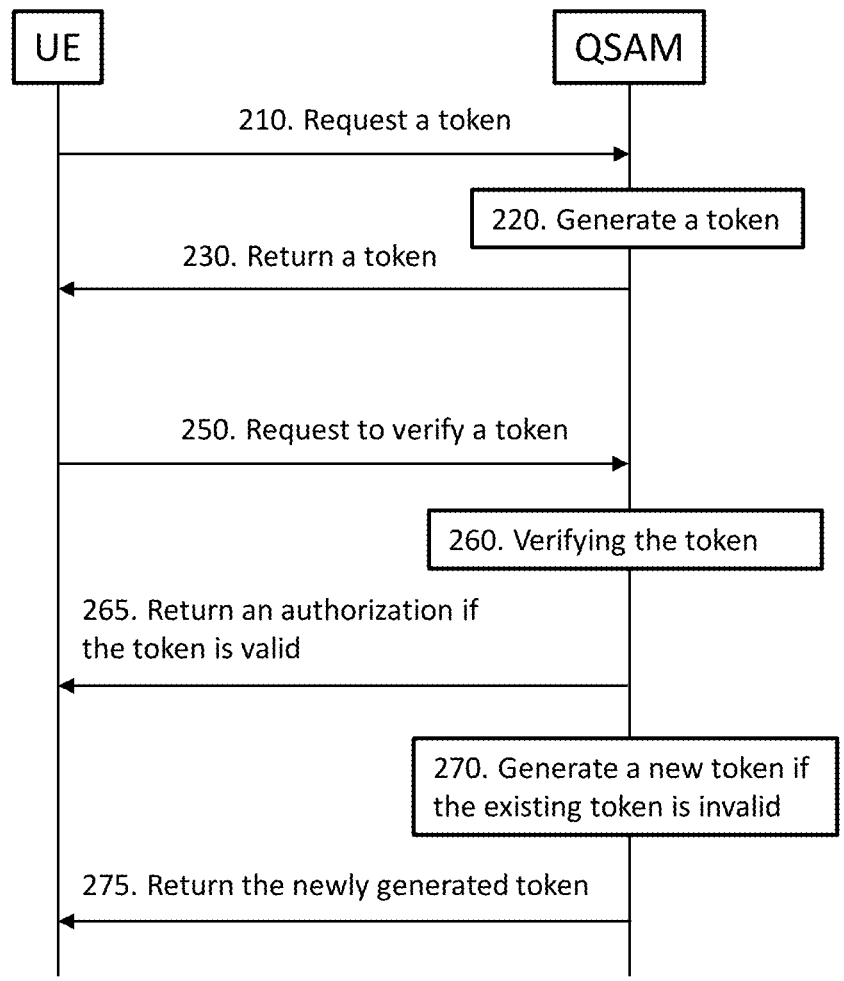
FIG. 2 is a flowchart illustrating a service authorization process by the QSAM according to embodiment of the present disclosure.

FIG. 2 is a flowchart illustrating a service authorization process by the QSAM according to an embodiment of the present disclosure. After a UE registers with a network slice using a particular gNB, the UE requests a token from the QSAM in step 210. A UE may use multiple network slices involving multiple gNBs. Similarly, a gNB may serve multiple UEs with multiple network slices. In embodiments, the QSAM simultaneously receives requests from various UEs, with each request includes paired UE and gNB information as well as corresponding network slice information. Upon receiving the request, the QSAM generates a token based on the request in step 220. The token generation process will be described in detail hereinafter. In step 230, the generated token is then returned to the requesting UE.

Referring again to FIG. 2, when a UE which already possesses a token requests service in a login process (steps 113 shown in FIG. 1), the UE requests the QSAM to verify its token in step 250. The QSAM verifies the token based on a method that is used in generating the token in step 260. If the token is verified to be valid, the QSAM returns an authorization in step 265. If the token is found to be invalid, the QSAM generates a new token based on current UE and gNB information in step 270. The newly generated token is then returned to the UE in step 275.

Figure 3:
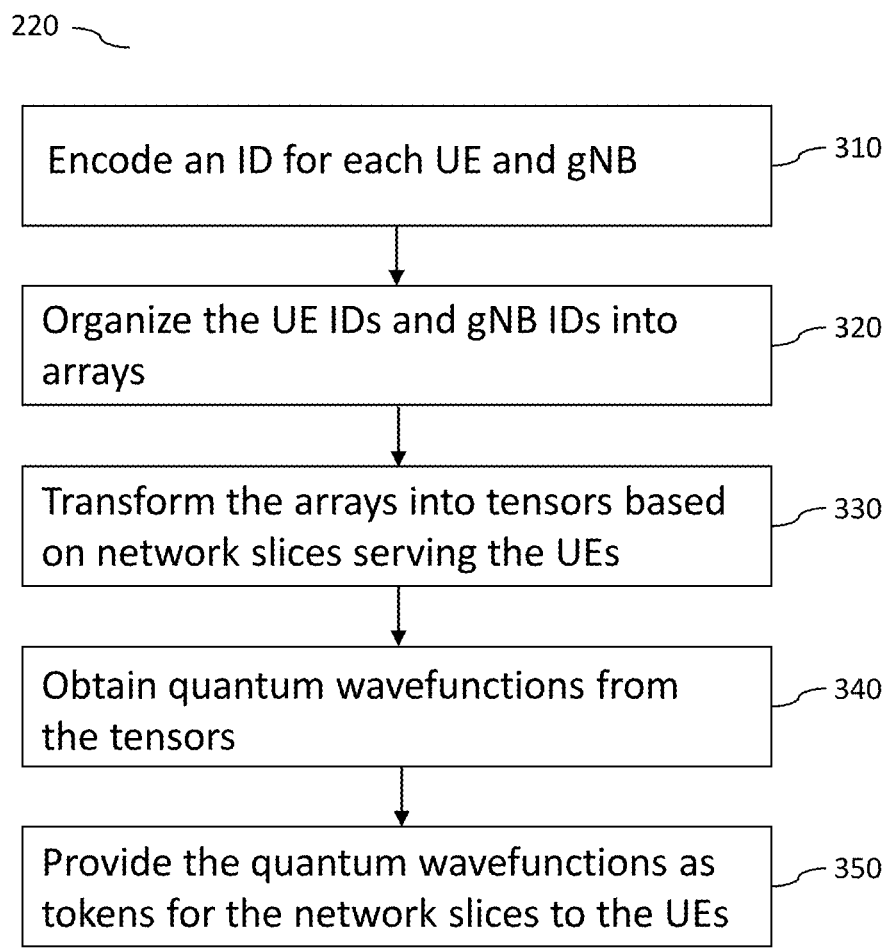
FIG. 3 is a flowchart illustrating a token generating process by the QSAM according to an embodiment of the present disclosure.

FIG. 3 is a flowchart illustrating the token generating process 220 by the QSAM according to an embodiment of the present disclosure. The token generating process 220 begins with encoding an identifier (ID) for each UE and gNB using, for example, a binary code (10101). The IDs are then organized into an array in step 320. The array is further transformed into tensors based on the network slices serving the UEs in step 330. Quantum wavefunctions are obtained from the tensors in step 340. In embodiments, the quantum wavefunctions are provided to the UEs as tokens for the requesting services with the registered network slices in step 350. As an example, a token contains not only a unique value representing the UE, gNB and network slice, such as an entanglement entropy, but also corresponding gNB information (ID). From the gNB information, the system can determine which gNB is managing the network slice and UE. From both the unique value and the gNB information, the system can determine which UE is in an uplink and which gNB secured channel is in a downlink.

In a 5G network, every network slice is a logical function. Although the network slices may share physical resources, they are completely separated logically. A group of network slices can be viewed as a collection of information of N number of UE and M number of gNB. A UE may be present in different network slices as shown in Tables 1A and 1B, where "1" represents service enabled and "0" represents service disabled. In embodiments, only enabled services are encoded and provided with a token.

TABLE 1A

| Network Slice #1 (NS$_1$) | | |
| --- | --- | --- |
| | gNB #1 | ... |
| UE #1 | 00001 | ... |
| UE #2 | 00000 | ... |
| ... | ... | ... |

TABLE 1B

| Network Slice #2 (NS$_2$) | | |
| --- | --- | --- |
| | gNB #1 ... | |
| UE #1 | 00000 | ... |
| UE #2 | 00011 | ... |
| ... | ... | ... |

The IDs can be adopted from any one of the following standards: (1) International Mobile Equipment Identity (IMEI); (2) IMEI for internet of things (IoT); (3) smart grid equipment: UK CCC coding system, 1 kks power plant identification system, French EDF coding system, and China state grid power equipment code.

Every network slice has two data components: (1) UE and gNB information; and (2) corresponding tag. The UE and gNB information can be viewed as virtual particles. The QSAM encodes such UE and gNB information and then uses a tensor network to describe their entanglement. A wavefunction used in calculating the tensor will be used as a token for the UE when requesting service.

As an example, a QSAM manages an AMF with 300 network slices for 280 UEs and 28 gNBs. The QSAM creates an ID code for each UE and gNB using, for instance, binary code. Information for network slice #1 includes 7840 data point (280×28, where 280 is the maximum number of UEs and 28 is the maximum number of gNBs in the AMF). When expanding this array into a vector, a length of the vector is 280×28=7840.

A complete data set for such AMF includes 300 units of 280×28 UE-and-gNB pairs forming a [300, 280, 28] tensor. A first dimensional component is used to index network slices; a second dimensional component represents rows of UEs; and a third dimensional component represents columns of gNBs. Each element in the tensor represents a correlation between a UE and a gNB (enable/disable), with a value between 00000 (disable) and 11111 (enable).

Below example provides an operation when only No. 11 to No. 100 network slices (99 slices) are to be extracted. As numbering for each dimension starts from 0, if $11^{th}$ to $100^{th}$ network slices are to be calculated, their numbering will be [10:99, :, :]. Similarly, if all 280 UE are to be calculated, their numbering will be [:, 0:279, :]. Here a method of using tag data is "one-hot vectors". So in this example, the number n will be represented as nth dimension has a value of 1 in a 28-dimensional vector. Referring to above Table 1A and 1B, using UE #1 as an example, tag 0 (UE #1) can be expressed as ([1111,0,0,0,0,0,0,0,0,0,0,0, 0,0,0,0,0,0,0,0,0,0,0,0,0,0]).

Quantum mechanics has a fundamental assumption that the Hilbert space of a composite system is the tensor product of the Hilbert spaces of its subsystems. Therefore, the many-body wavefunction is naturally a tensor. For an n-body system, its wavefunction is an n-order tensor. There are many techniques for implementing tensor networks, such as matrix product states (MPS), projected entangled pair states (PEPS), multiscale entanglement renormalization ansats (MERA). In this example, Google's method of converting high-dimensional vectors into N-order tensors is adopted. The exemplary operation simulates quantum classifiers (including errors), and aggregates all the tensors of the network slices to obtain tensors T_(i1, i2, . . . , iN).

In practice, tensor network can be used to describe the correlation of entanglement of virtual particles (labeled data) in a complete simplex. Tensor network states can effectively characterize the properties of complex strongly correlated multi-body systems with fewer parameters. Therefore, it can be used as a tentative function in the variational principle, and then numerically solve the energy of the ground state and the low excited state of the system, and then obtain the quantum entanglement degree, which can be implemented by singular value decomposition (SVD) to obtain a description of the quantum wavefunction structure (wavefunction). In a spatial dimension, the Schmidt decomposition of the wave function is an SVD, and the SVD spectrum is the square root of the eigenvalues of the simplified density matrix. In physics, SVD is simply applied to a specific matrix and then observe the number of non-zero singular values of that matrix. This is the main idea behind the so-called Schmidt rank of quantum states, i.e., the integers of non-zero singular values represent how much entanglement exists in the serving network slice. In other words, if the Schmidt rank (that is, the number of singular values) is strictly greater than 1, it is called an entangled state, otherwise it is not an entangled state.

Use two labeled data (quantum A and B) as an example to generate a token, an entanglement state can be calculated by following equation:

$$E_r(\rho_{AB}) = -\Sigma_n \alpha_{nn} \ln \alpha_{nn} - S(\rho_{AB}) \qquad \text{Eq. (1)}$$

where $\rho_{AB}$ is the density matrices, $S(\rho_{AB})$ is Von Neumann entropy of $\rho_{AB}$, and $\alpha$ represents eigenkets and eigenvalue.

When tensor network is used to describe all service network slice (network slicing) spaces, if a state in the space changes (UE or gNB information is modified), the tensor network will also change. Malware may forge or tamper with quantum tokens. Here tampering refers to modifying UE or gNB information in order to allow a UE to gain inappropriate access rights. When the QSAM performs quantum entanglement detection on a token submitted by a UE in a particular network slice and find differences between the submitted token and the original token, the QSAM will decline the service request by the UE and generate a new token for the UE as shown in FIG. 2.

The timing of quantum token configuration and update needs to be specified in the initial register/UE-Config-Update, that is, it is necessary to confirm that the UE has been configured or updated after network slice selection assistance information (NSSAI) is completed. Updating quantum tokens needs to consider: the quantum token can be updated only after the RRCSetupComplete provides the UE with NSSAI configuration, or the configuration update command notifies the UE that the update is complete.

Beside quantum entanglement detection, the QSAM may also decline a service request by a UE when one of following conditions occurs: (1) a number of service requests by the UE has exceeded a predetermined threshold; (2) a life time of the token has exceeded a predetermined value. At these times, the QSAM may proceed to refresh the token for such UE. However, frequent token refreshing consumes network resources between the UE and gNB. Therefore, certain restrictions need to be considered. For example, token's refreshing time should be smaller than the token's designated expiration time (RefreshTime<TokenExpireTime), i.e., the token needs to be refreshed before it expires. In another example, a remaining time after a token refresh should be larger than a predetermined threshold (TokenExpireTime−LapsedTime=RestTime>Threshold, Y). In yet another example, token refresh time (RefreshTime) should be longer than last refresh time (threshold Z), i.e., all the UE must have received last refreshed token before embarking on a new refresh.

In dynamic network slicing, configuration and deployment of network slices may change in response to different service requests and fluctuating resources. The resource allocation of slices deployed by dynamic network slicing often changes over time, and the configuration may be changed according to dynamic changes in traffic or QoS requirements to improve the resource utilization efficiency in the network. When the configuration of the network slice changes, the quantum token should also be updated.

Figure 4:
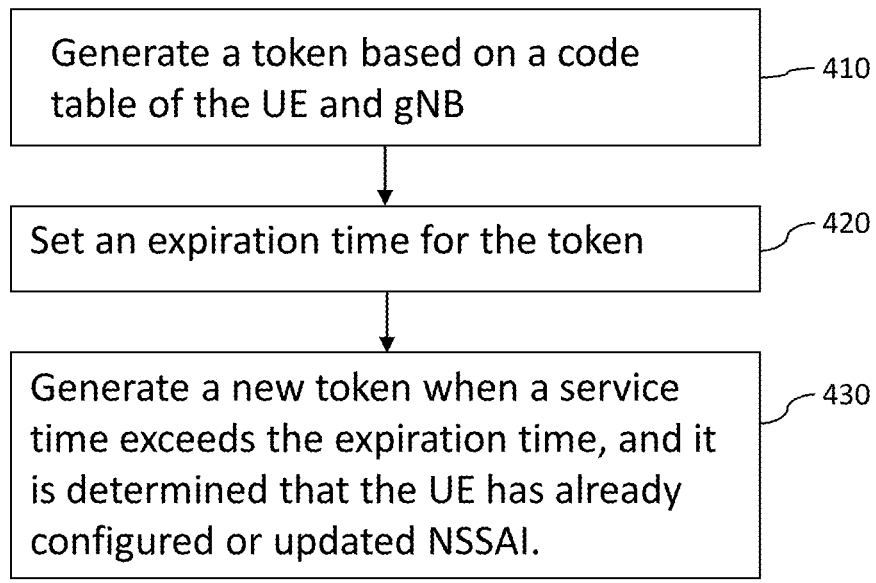
FIG. 4 is a flowchart illustrating a token generating process according to an embodiment of the present disclosure.

FIG. 4 is a flowchart illustrating a token generating process according to an embodiment of the present disclosure. The token generating process begins with step 410 which generates a token based on a code table of the UE and gNB as illustrated in FIG. 3. In step 420, an expiration time, i.e., a life time, is set for the token. In step 430, a new token is generated when a service time exceeds the expiration time, and it is determined that the UE has already configured or updated NSSAI.

Figure 5:
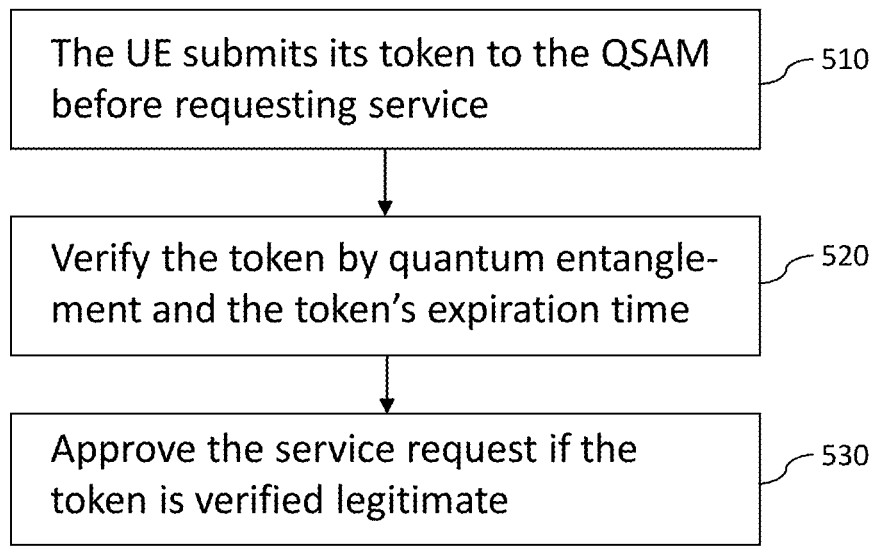
FIG. 5 is a flowchart illustrating a token verification process according to an embodiment of the present disclosure.

FIG. 5 is a flowchart illustrating a token verification process according to an embodiment of the present disclosure. When a UE is requesting service from a network, the UE submits its token to the QSAM in step 510. In step 520, the QSAM verifies the UE's token by quantum entanglement detection and determining the token's expiration time. If the token is verified to be legitimate, the QSAM will approve the UE's service request in step 530.

As a wavefunction is used as the token, and the wavefunction is a complex-valued probability magnitude value, the quantum entanglement detection can directly calculate the probability magnitude value. Alternatively, an experimental method can be used to determine whether a state p is entangled. In embodiments, a feature categorization can be obtained by training label data of the network slices, such categorization can later be used for quantum entanglement detection.

Using the concept of neural network detection, quantum entanglement detection can be redefined as an anomaly detection problem, for which unsupervised neural networks are applicable. Due to other useful quantum properties, such as Bell nonlocality and Einstein-Podolsky-Rosen maneuverability which also have the same property defined as a distinguishable sample of convex sets, there are many unsupervised ways to implement the quantum entanglement detection.

As an example, autoencoder is a widely used unsupervised learning method that aims to learn an efficient representation of a set of data. An exemplary autoencoder consists of two modules, an encoder E and a decoder D, where the former learns a latent representation (encoding) of the input data and the latter is trained to generate an output as close as possible to its original input from the latent input express.

Generative adversarial networks (GANs) is another unsupervised learning method. Specifically, two neural networks, the generator G and the discriminator D, compete with each other in a zero-sum game in a GAN, where the gain of one module is the loss of the other module. The technique learns to generate new data with the same statistics as the training set.

A siamese neural network (SNN) is a class of neural network architectures that contain two or more identical sub-networks. SNN takes two inputs and detects their differences by comparing the output vectors of the network. SNN is able to learn common features to make predictions on unknown distributions even though there are few examples available. This provides a competitive approach to pattern recognition that does not require domain-specific knowledge. SNN can be trained in an unsupervised manner because no labels of the input data are required.

According to 3GPP, manufacturing facilities can be divided into five general categories: factory automation, process automation, human-machine interaction and production IT, logistics and warehousing, and monitoring and maintenance. Network slicing is an end-to-end technology that encompasses from radio access network (RAN) to the new core (5GC), and can be applied to all these categories. For example, with the assistance of AR assisted devices, a maintenance work can have real-time display of device status through smart glasses or helmets during device inspections and maintenances. For this application, ultra-low latency and high bandwidth capability become a necessity due to added digital/graphic information for the instant views.

In addition to 5G IoT applications, the presently disclosed QSAM can be applied to other applications, such as augmented reality (AR) assisted devices which are used for equipment inspection and maintenance in smart factories. The AR assisted devices require low latency, high data volume and high data rates in three service needs: AR services, video streaming and control signal communication. In response, three network slices are assigned to such an AR assisted device. One network slice is used for the AR services; one network slice is used for video streaming and another network slice is used for control signal communication. The AR assisted device need to be connected to the above three network slices to perform required function. These three network slices can use the same gNB or different gNBs.

For example, a system has three network slices, three gNBs and two AR assisted devices (UEs). A dataset is a [3, 2, 3] tensor composed of a 3×2×3 combination, and the tensor is used to represent the NS space. Total NS space (TNS) is defined as the tensor product of all NS spaces (NS #1, NS #2, NS #3), $T_{NS}=(NS_1, NS_2, NS_3)$. Relational encoding of the UE ID and gNB ID in each NS will generate an independent NS vector ($NS_1, NS_2, NS_3$). Here, $T_{NS}$ is the service slice tensor, $NS_1, NS_2, NS_3$ represent the UE and gNB coding states in each service slice.

It is more meaningful that tensor networks should be used to consider higher-dimensional spatial data. However, for illustration purpose, a simple [3, 2, 3] tensor is described below.

In [3, 2, 3] tensor, the first-dimension number is used to index NS, the second-dimension number is used to index the information table in each NS. For example, in the [3, 2, 3] tensor, the first "2" is the UE row, and the second "3" is the gNB column. Each element in the NS tensor ($NS_1, NS_2, NS_3$) represents the relationship (enable/disable) between UE and gNB in this NS (NS #1 or NS #2 or NS #3), and the value is between 00000 (disable) and 11111 (enable). In this example, "1111" is encoded by the QSAM. A length of the 2-bit information (11111) is determined by QSAM according to network resources or the number of UEs.

Taking NS #1 as an illustration, the QSAM encodes the UE and gNB in NS #1. It encodes the UE's ID as 11110 in binary, and encodes the gNB's ID as 11000 in binary, and XOR the two to get 110 which is $NS_1$. The $T_{NS}=(110, NS_2, NS_3)$. $NS_2$ and $NS_3$ can be calculated in the similar manner. The QSAM obtains the quantum wavefunction of the $T_{NS}$ through singular value decomposition (SVD). The quantum wavefunction is then used as a quantum token. Although XOR and SVD are used in these examples, other methods may also be used to obtain the quantum wavefunction.

In embodiments, the AR devices are used in a 5G network with an access management function (AMF). Such engagement process begins with the AR device (UE) sends a registration request to the AMF, and the request packet contains the user-specific NSSAI and Slice/Service Type. After a successful registration with the AMF, the UE sends a registration request to the QSAM. The AMF transfers the information of the NS to the UDM for confirmation. The UDM confirms whether the UE has the right to use the NS and informs the AMF of the result. When the AMF learns that the UE can use the NS, the AMF will transfer the information to the NSSF to obtain the slice information, and after the AUSF authorization and authentication pass, the AMF will send back a successful registration message is to the UE, and QSAM records the gNB information. Next, the QSAM generates a quantum token for the UE based on all the NS in the NSSAI, and returns the quantum token to the UE.

When the UE requests to use the NS, the UE need to use radio resource control (RRC) connection to convey the request. The AMF determines whether to grant the UE the requested service based on the AMF's configuration. After AMF grants the service request, the QSAM uses numerical comparison or other method to detect the validity of the quantum token submitted by the UE. If the token is valid, the UE can begin using the NS. If the quantum token is not valid, NSSAI informs the QSAM to generate new quantum tokens and send the new ones to all the UEs that use the NS.

In dynamic network slicing situation, due to quality of service (QoS) issues, NSSAI needs to update the NSs. QSAM needs to wait for the completion of the NSSAI update before regenerating new tokens, and sending the new tokens to all the UE that uses the updated NSs.

In embodiments, the quantum token generation can use only data of either the UE or the gNB data. In such way, the QSAM can still generate quantum token when both UE and gNB data are not available. With singular data, UE's or gNB's, the token generation speed can be increased due to reduced calculation.

Using the above example of 3 NSs, 3 gNBs and 2 AR assisted devices (UEs). The dataset is a [3, 2, 3] tensor consisting of a 3×2×3 combination. The 3 UE's ID in $NS_1$, $NS_2$ and NS 3 are 1234, 2566 and 3456, respectively. The QSAM encodes the UE' ID to obtain 10011010010, 101000000110, 110110000000 and $T_{NS}$=(10011010010, 101000000110, 110110000000). The QSAM obtains the quantum wavefunction of the $T_{NS}$ through SVD, and use this value as a quantum token through the process described above.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, Software modules or components may be located in local and/or remote memory storage devices. In addition, data being tied or rendered together in a database record may be resident in the same memory device, or across several memory devices, and may be linked together in fields of a record in a database across a network.

Although the disclosure is illustrated and described herein as embodied in one or more specific examples, it is nevertheless not intended to be limited to the details shown, since various modifications and structural changes may be made therein without departing from the spirit of the disclosure and within the scope and range of equivalents of the claims. Accordingly, it is appropriate that the appended claims be construed broadly and, in a manner, consistent with the scope of the disclosure, as set forth in the following claims.

What is claimed is:

1. A method for verifying a service request in a telecommunication network with a plurality of service slices used by a plurality of base stations to provide services to a plurality of user equipment, the method comprising:
   registering the plurality of base stations and the plurality of user equipment with a service authorization management module;
   encoding, by the service authorization management module, information of the plurality of base stations and the plurality of user equipment;
   transforming, by the service authorization management module, the encoded information into a tensor network to describe entanglements of the plurality of base stations and the plurality of user equipment;
   obtaining, by the service authorization management module, a plurality of quantum wavefunctions from the tensor network;
   generating, by the service authorization management module, a token from one of the plurality of quantum wavefunctions, the token containing information identifying a first base station of the plurality of base stations providing services to a first user equipment of the plurality of user equipment through a first service slice of the plurality of service slices;
   sending, by the service authorization management module, the generated token to the first user equipment;
   receiving, by the service authorization management module, the generated token from the first user equipment requesting service from the first base station using the first service slice;
   granting the service request in response to the received token being verified as valid by the service authorization management module; and
   denying the service request in response to the received token being verified as invalid by the service authorization management module.

2. The method of claim 1, wherein the information are identifications of the plurality of base stations and the plurality of user equipment.

3. The method of claim 1, wherein verifying the received token comprises detecting quantum entanglement differences between the generated token and the received token by the service authorization management module.

4. The method of claim 1 further comprising setting an expiration time for the generated token by the service authorization management module.

5. The method of claim 4, wherein verifying the submitted token comprises checking a remaining lifetime of the submitted token against a token refresh time plus a predetermined threshold time.

6. The method of claim 1 further comprising generating a new token to be sent to the first user equipment after the received token being verified as invalid by the service authorization management module.

7. The method of claim 6 further comprising verifying the first user equipment being updated to use the first service slice before generating the new token by the service authorization management module.

8. A method for verifying a service request in a telecommunication network with a plurality of service slices used by a plurality of base stations to provide services to a plurality of user equipment, the method comprising:
   Registering the plurality of base stations and the plurality of user equipment with a service authorization management module;
   encoding, by the service authorization management module, information of the plurality of base stations and the plurality of user equipment;
   transforming, by the service authorization management module, the encoded information into a tensor network to describe entanglements of the plurality of base stations and the plurality of user equipment;
   obtaining, by the service authorization management module, a plurality of quantum wavefunctions from the tensor network;
   generating, by the service authorization management module, a token from one of the plurality of quantum wavefunctions, the token containing information identifying a first base station of the plurality of base stations providing services to a first user equipment of the plurality of user equipment through a first service slice of the plurality of service slices;
   setting an expiration time for the generated token by the service authorization management module;
   sending, by the service authorization management module, the generated token to the first user equipment;
   receiving, by the service authorization management module, the generated token from the first user equipment requesting service from the first base station using the first service slice;
   granting the service request in response to the received token being verified as valid by the service authorization management module; and denying the service request in response to the received token being verified as invalid by the service authorization management module.

9. The method of claim 8, wherein the information are identifications of the plurality of base stations and the plurality of user equipment.

10. The method of claim 8, wherein verifying the received token comprises detecting quantum entanglement differences between the generated token and the received token by the service authorization management module.

11. The method of claim 8, wherein verifying the received token comprises checking a remaining lifetime of the received token against a token refresh time plus a predetermined threshold time.

12. The method of claim 8 further comprising generating a new token to be sent to the first user equipment after the received token being verified as invalid by the service authorization management module.

13. The method of claim 12 further comprising verifying the first user equipment being updated to use the first service slice before generating the new token by the service authorization management module.

14. A telecommunication network comprising:
- a plurality of service slices used by a plurality of base stations to provide services to a plurality of user equipment;
- a service authorization management module configured to:
  - register the plurality of base stations and the plurality of user equipment;
  - encode information of the plurality of base stations and the plurality of user equipment;
  - transform the encoded information into a tensor network to describe entanglements of the plurality of base stations and the plurality of user equipment;
  - obtain a plurality of quantum wavefunctions from the tensor network;
  - generate a token from one of the plurality of quantum wavefunctions, the token containing information identifying a first base station of the plurality of base stations providing services to a first user equipment of the plurality of user equipment through a first service slice of the plurality of service slices;
  - send the generated token to the first user equipment;
  - receive the generated token when the first user equipment requesting service from the first base station using the first service slice;
  - grant the service request if the received token is verified to be valid by the service authorization management module; and
  - deny the service request if the received token is verified as invalid by the service authorization management module.

\* \* \* \* \*